United States Patent [19]

Yoshinori et al.

[11] Patent Number: 4,683,182

[45] Date of Patent: Jul. 28, 1987

[54] RECHARGEABLE ELECTROCHEMICAL APPARATUS

[75] Inventors: Toyoguchi Yoshinori, Yao; Junichi Yamaura, Osaka; Tooru Matsui, Moriguchi; Takashi Iijima, Hirakata, all of Japan

[73] Assignee: Matsushita Electric Industrial Co., Ltd., Osaka, Japan

[21] Appl. No.: 873,093

[22] PCT Filed: Mar. 6, 1984

[86] PCT No.: PCT/JP84/00086

§ 371 Date: Nov. 5, 1984

§ 102(e) Date: Nov. 5, 1984

[87] PCT Pub. No.: WO84/03590

PCT Pub. Date: Sep. 13, 1984

Related U.S. Application Data

[63] Continuation of Ser. No. 672,260, Nov. 5, 1984, abandoned.

[30] Foreign Application Priority Data

| Mar. 7, 1983 | [JP] | Japan | 58-36877 |
| Mar. 7, 1983 | [JP] | Japan | 58-36878 |
| Mar. 7, 1983 | [JP] | Japan | 58-36880 |
| Mar. 7, 1983 | [JP] | Japan | 58-36881 |
| Aug. 29, 1983 | [JP] | Japan | 58-158329 |

[51] Int. Cl.$^4$ .................... H01M 10/36; H01M 4/44
[52] U.S. Cl. .................... 429/194; 429/222
[58] Field of Search ............ 429/194, 218, 222

[56] References Cited

U.S. PATENT DOCUMENTS

| 3,506,490 | 4/1970 | Buzzelli | 429/104 |
| 4,048,395 | 9/1977 | Lai | . |
| 4,316,777 | 2/1982 | Dey | . |
| 4,330,601 | 5/1982 | Dey | . |

FOREIGN PATENT DOCUMENTS

| 56-73860 | 6/1981 | Japan | . |
| 57-98978 | 6/1982 | Japan | . |
| 0141870 | 9/1982 | Japan | 429/194 |

OTHER PUBLICATIONS

Iwase, K. and Okamoto, S., "Standard Phase-diagrams of Binary Alloys" (1953), pp. 192 and 339.
Wang et al., "Behavior of Some Binary Lithium Alloys (etc)", Journal of the Electrochemical Society, vol. 133, No. 3, (3/86), pp. 457-460.

Primary Examiner—Donald L. Walton
Attorney, Agent, or Firm—Spencer & Frank

[57] ABSTRACT

The present invention relates to a rechargeable negative electrode for an electrochemical apparatus using nonaqueous electrolyte, said electrode comprising an alloy comprising Cd and at least one metal selected from the group consisting of Sn, Pb, In and Bi, as well as to a rechargeable electrochemical apparatus comprising a combination of said negative electrode with a positive electrode having reversibility in charge and discharge.

The above-mentioned negative electrode reversibly absorbs and desorbs alkali metal ions, as the result of charge and discharge, in nonaqueous electrolyte containing alkali metal ions. It undergoes no pulverization even after repeated charge and discharge and maintains its shape stably, so that it has a long chargeand-discharge life. Further, since it can absorb a large quantity of alkali metal per unit volume, it is of high energy density.

9 Claims, 12 Drawing Figures

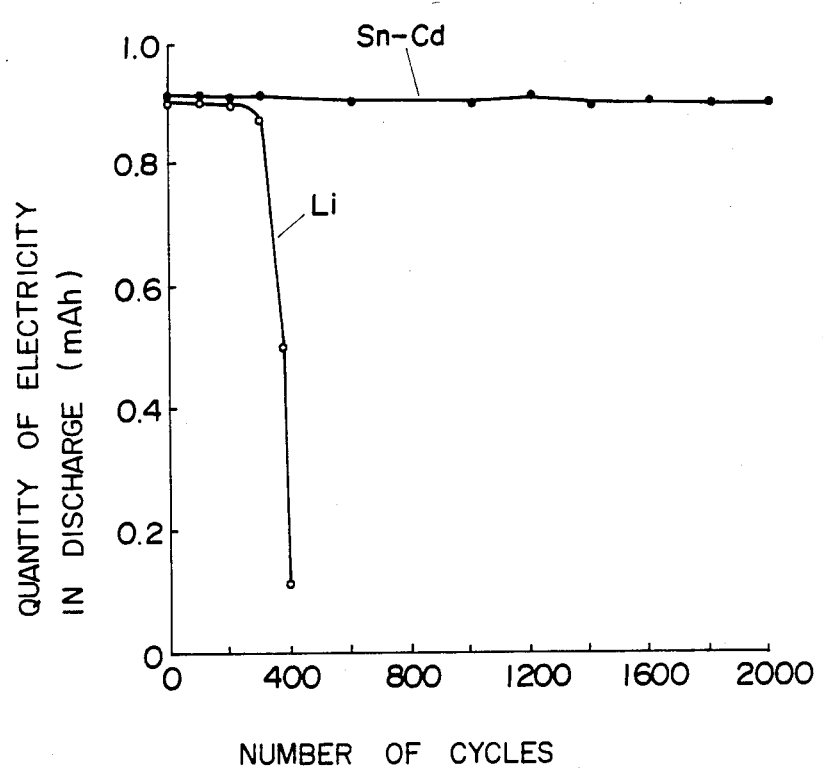

RECHARGEABLE ELECTROCHEMICAL APPARATUS

This application is a continuation of application Ser. No. 06/672,260, filed Nov. 5, 1984, now abandoned.

TECHNICAL FIELD

The present invention relates to a rechargeable electrochemical apparatus using nonaqueous electrolyte, and more particularly the present invention relates to a nonaqueous electrolyte secondary battery and a rechargeable negative electrode.

BACKGROUND ART

As nonaqueous electrolyte secondary batteries using alkali metals such as lithium and sodium as the negative electrode, there has been up to date actively pursued the development of those batteries which use, as positive-electrode active material, various intercalation compounds and the like including titanium disulfide ($TiS_2$) and, as electrolyte, organic electrolyte obtained by dissolving lithium perchlorate or the like in an organic solvent such as propylene carbonate. These secondary batteries are characterized by a high battery voltage and a high energy density owing to the use of alkali metals in the negative electrode.

However, the secondary batteries of this kind have not yet been put to practical use up to date. The main reason for this is that the number of times of possible charge-and-discharge is small (charge-and-discharge cycle life is short) and the charge-and-discharge efficiency in charge-and-discharge cycle is low. This is caused largely by deterioration of the negative electrode. The lithium negative electrode mainly used at present comprises plate-formed metallic lithium press-bonded to a screen-formed current collector formed of nickel or the like. During discharging stage, metallic lithium is dissolved into electrolyte as lithium ions. But, in charging stage, it is difficult to precipitate the lithium into plate form as before discharge. Rather, there occurs such phenomena that dendrite-like (aborescent) lithium is formed, which falls off breaking near the root, or the lithium precipitated in small-bead (moss-like) form and disconnects itself from the current collector. Consequently, the battery becomes incapable of being charged and discharged. Further, it often occurs that the dendrite-like metallic lithium thus formed penetrates the separator separating the positive electrode from the negative electrode and comes into contact with the positive electrode and cause a shortcircuit, which results in failure of function of the battery.

Various methods have been tried up to the present to obviate the defects of the negative electrode mentioned above. In general, there are reported methods which comprise altering the material of the negative-electrode current collector to improve its adhesion to the precipitating lithium or methods which comprise adding to the electrolyte an additive for preventing the formation of dendrite-like metal. But these methods are not always effective. As to alteration of the current collector material, it is effective for lithium precipitating directly onto the current collector material; but on further continuation of charge (precipitation), lithium comes to precipitate upon the precipitated lithium, whereby the effect of current collector material is lost. As to the additives, also, they are effective in the early stage of charge-and-discharge cycle; but with further repetition of the cycle, most of the additives decompose owing to oxidation-reduction or the like in the battery, thus losing their effectiveness.

More recently, it has been proposed to use an alloy with lithium as the negative electrode. A well known example is lithium-aluminum alloy. In this case, there is disadvantage in that, though a uniform alloy is formed for the time being, the uniformity disappears on repetition of charge and discharge and, particularly when the proportion of lithium is large, the electrode becomes fine-grained and disintegrates. Also, it has been proposed to use a solid solution of silver and alkali metal [Japanese Patent Application Kokai (Laid-open) No. 73860/81; U.S. Pat. Nos. 4,316,777 and 4,330,601]. In this case, it is described that no disintegration occurs as in the aluminum alloy; but only a small amount of lithium goes into alloy in sufficiently high speed, and sometimes metallic lithium precipitates without alloying itself; to avoid this, use of a porous body or the like has been recommended. Accordingly, the charge efficiency with a large current is poor; with alloys containing large amount of lithium, the pulverization caused by charge-and-discharge is gradually accelerated, resulting in sharp decrease in cycle life.

Further, there is an idea of using lithium-mercury alloy [Japanese Patent Application Kokai (Laid-open) No. 98,978/82] or that of using lithium-lead alloy [Japanese Patent Application Kokai (Laid-open) No. 141,869/82]. In the case of lithium-mercury alloy, however, the negative electrode changes into mercury metal in the form of liquid particles as the result of discharge, and cannot maintain the form of the electrode. In the case of lithium-lead alloy, the pulverization of the electrode due to charge-and-discharge is more severe than in silver solid solution.

Further, it is conceivable to use lithium-tin or lithium-tin-lead alloy. Also when these alloys are used, the pulverization of the alloy occurs with the increase of the amount of lithium incorporated into alloy by charging, which makes maintaining the form as an electrode impossible.

Thus, there has yet been found no negative electrode rechargeable in nonaqueous electrolyte which can be satisfactorily used in practice.

DISCLOSURE OF THE INVENTION

An object of the present invention is to provide a rechargeable negative electrode for an electrochemical apparatus including a nonaqueous electrolyte secondary battery mentioned above and to provide a rechargeable negative electrode which absorbs well the active material-alkali metals, particularly lithium (Li), does not undergo pulverization by charge, and maintains the form of the electrode stably.

Antoher object of the present invention is to provide a rechargeable negative electrode which can absorb a large amount of alkali metal per unit volume, hence has a large discharge capacity, and moreover has a long life, enduring repeated charge and discharge.

A further object of the present invention is to provide a rechargeable electrochemical apparatus of a long charge-and-discharge life and of a high voltage. A still further object is to provide a rechargeable electrochemical apparatus of a high energy density.

The aforesaid objects of the present invention can be achieved by using, as negative electrode material, an alloy comprising cadmium (Cd) and at least one metal selected from the group consisting of bismuth (Bi), indium (In), tin (Sn) and lead (Pb).

When charge-and-discharge is conducted in a nonaqueous electrolyte containing alkali metal ions with above-mentioned alloy used as the negative electrode, the electrode absorbs the alkali metal ion in the electrolyte as the result of charge, forming an alloy with the alkali metal, and desorbs the absorbed alkali metal into the electrolyte as ions as the result of discharge. Accordingly, charge and discharge can be conducted reversibly. During charging stage, there occurs no short-circuit between the positive and negative electrode due to dendrite-like precipitation of the alkali metal on the surface of the negative electrode, nor disintegration of the negative electrode due to pulverization because no alkali metal in the metallic state is present in the electro chemical apparatus.

Among the components of the alloy mentioned above, Cd plays a role of a so-called binder of preventing pulverization of the negative electrode which would accompany the absorption of the alkali metal caused by charge. Bi, In, Sn and Pb serve to increase the absorbed amount of alkali metal and increase the quantity of electricity in charge and discharge. Accordingly, for applications where the quantity of electricity in charge and discharge is not large and the life in charge and discharge is important, larger proportion of Cd is favorable. On the other hand, for applications where the quantity of electricity in charge and discharge is required to be large, not too large a proportion of Cd is advantageous. From the consideration of environmental pollution a smaller amount of Cd is preferable.

The mechanism of reaction occurring when the alloy of the present invention is used as the negative electrode is assumed as follows. Thus, it is conceived that, when Li is used as the alkali metal, during charge Li ions in the electrolyte react on the alloy surface, forming a kind of intermetallic compound or an alloy of Li with Bi, In, Sn or Pb in the alloy, and the Li then diffuses into the alloy of the negative electrode, forming a Li alloy. Accordingly, the charge reaction takes place at a more noble potential than that of metallic Li, and absorption of Li proceeds until the amount of Li in the alloy reaches saturation and the potential of the alloy becomes equal to that of metallic lithium.

For example, when an alloy comprising 80% by weight of Pb and 20% by weight of Cd [Pb(80)—Cd(20)] is used, the charge-and-discharge reaction may be expressed as follows.

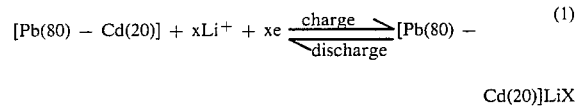
(1)

wherein [Pb(80)—Cd(20)]Li$_x$ indicates Pb-Cd-Li alloy formed as the result of charge.

As to the range of charge and discharge, the discharge is not required to be conducted until the Li absorbed in the negative electrode alloy is completely desorbed as in equation (1); the charge and discharge may be conducted such that the amount of Li absorbed in the negative electrode is altered, as in equation (2).

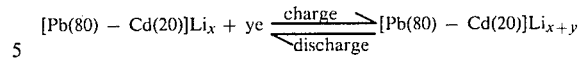
(2)

The negative electrode alloy of the present invention may be integrated into an electrochemical apparatus in the state of above-mentioned alloy. But it may also be integrated thereinto in a state wherein active material-alkali metals such as Li-has been absorbed therein or in the form of Li alloy. Further, instead of making the alloy absorb Li electrochemically, it may be prepared as Li alloy according to alloy formulations. The content of Li then is the saturation amount which can be absorbed electrochemically as mentioned above. Though the saturation amount varies depending on alloy composition, it is about 20% by weight as content of Li.

The alloy for the negative electrode of this invention may be integrated into an electrochemical apparatus in the state of above-mentioned alloy. It may also be integrated thereinto as an alloy which has absorbed active material-alkali metal, for example a lithium alloy which has absorbed lithium. Further, instead of making the alloy absorbed Li electrochemically, it may be prepared as Li alloy according to alloy formulations. The content of Li then is, as mentioned above, up to the saturation amount which can be absorbed electrochemically. Though the saturation amount varies depending on alloy composition, it is about 20% by weight as content of Li.

One example of the alloy for the negative electrode of this invention is a binary alloy of Cd with Bi, In, Sn or Pb. In a binary alloy of Cd with Sn, In or Pb, the Cd content is preferably 10 to 80% by weight. When as small a quantity of Cd as possible is desired from the viewpoint of environmental pollution, 20 to 40% is particularly preferred.

As to a ternary, quarternary or more multiple components alloy, mention may be made of an alloy of Cd with at least two metals selected from the group consisting of Sn, Bi, Pb and In. In this case, Cd content is preferably 10 to 80% by weight and the sum of the contents of the other components is preferably 80 to 25% by weight. A Cd content of 20 to 40% by weight is particularly preferred.

Among the above-mentioned various alloys, binary alloys of Cd with at least one metal selected from Sn and Pb are most practical from the viewpoint of performance and cost. In may be added thereto. Particularly, In facilitates the production of the electrode. A preferably In content is 3 to 10% by weight.

As to a positive electrode for constituting a rechargeable electrochemical apparatus in combination with the negative electrode of the present invention, those which have reversibility of charge-and-discharge are used. An example is positive electrode having MoO$_3$, TiS$_2$ and the like as active material.

A combination of an electrode which is used in an electric double layer capacitor, such as the well-known carbonaceous electrode, with the negative electrode of the present invention can be used also as a backup power source for a memory.

As to the nonaqueous electrolyte, organic electrolytes are favorably used. As to the organic solvent and the alkali metal salt of solute, there may be used, respectively, well-known ones which are used in organic electrolyte batteries. Examples of the former include propylene carbonate, γ-butyrolactone, ethylene carbonate, 1,2-dimethoxyethane, tetrahydrofuran, 2-methyltetrahydrofuran and 1,3-dioxolan. Examples of the latter include lithium salts such as $LiClO_4$, $LiBF_4$, $LiAsF_6$, $LiSO_3CF_3$ and $LiPF_6$, sodium salts such as $NaClO_4$, and potassum salts such as $KPF_6$. These organic solvents and solutes can be used, respectively, each alone or in combination of plural thereof.

As to the nonaqueous electrolyte, there may also be used a solid electrolyte of alkali metal ion conductivity. As to an example of solid electrolyte, e.g. that having lithium ion conductivity, mention may be made of $Li_3N$ and $Li_2O \cdot Li_4SiO_4$ $Li_3PO_4$.

As described above, the use of a Cd-containing alloy in a negative electrode for a nonaqueous electrolyte battery gives an electrode having a large charge-and-discharge capacity and a long cycle life, and thus offers a great advantage.

BRIEF DESCRIPTION OF THE DRAWINGS

FIG. 12 is a graph obtained by plotting the quantity of electricity in discharge of an electrochemical cell provided with either Li as the negative electrode (prior example) or Sn-Cd alloy as the negative electrode (Example of this invention) and, respectively, with carbon as the positive electrode against the number of cycles.

BEST MODE FOR CARRYING OUT THE INVENTION

Figure 1:
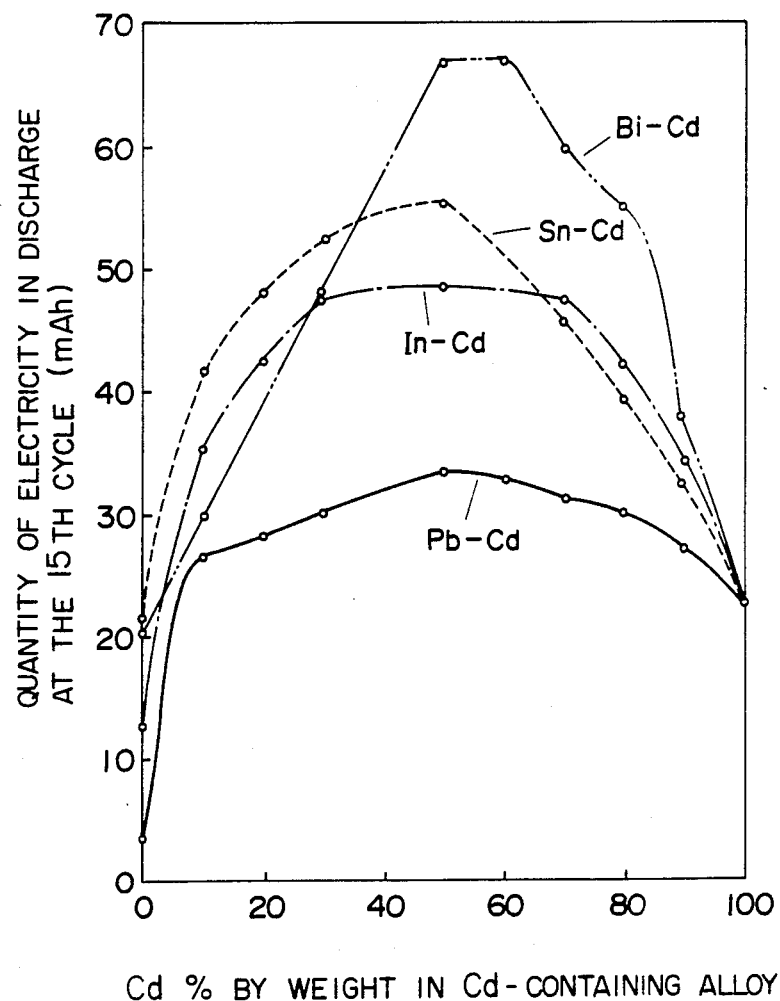
FIG. 1 is a graph obtained by plotting Cd % by weight in Cd-containing alloy against the quantity of electricity in discharge at the 15th cycle.

The characteristics of the rechargeable negative electrode of the present invention will be illustrated below in comparison with those of metals and alloys of Comparative Examples.

The apparatus used for evaluating the characteristics of the negative electrode was constituted of a battery jar having a test electrode and an opposite electrode inserted therein, an battery jar having a reference electrode inserted therein, and a liquid connection bridge connecting the two jars. The electrolyte used was propylene carbonate containing 1 mol/l of lithium perchlorate ($LiClO_4$) dissolved therein. The test electrode used was prepared from various metals or alloys in 1 cm square and 1 mm thick; a nickel ribbon was fitted up thereto as a lead wire by embedding. The opposite electrode used was a positive electrode containing $TiS_2$ as the active material which enabled reversible charge and discharge; the reference electrode used was metallic lithium.

The test procedure was as follows: by using the test electrode and the opposite electrode as the negative and positive electrode, respectively, charge was conducted at a constant current of 5 mA until the potential of the test electrode reached 0 V against that of the reference electrode; subsequently, discharge was conducted at a constant current of 5 mA until the potential of the test electrode reached 1.0 V against that of the reference electrode; the above charge-and-discharge was then conducted repeatedly.

In the Tables below are shown, for each of the Examples, the quantity of electricity in discharge at the 1st and the 15th cycle as well as, as the cycle characteristic, the quotient obtained by dividing the quantity of electricity in discharge at the 15th cycle by that at the 1st cycle. It can be said that the larger the quantity of electricity in discharge and the value of the cycle characteristic in the Table, the better the negative electrode is.

EXAMPLE 1

Tests were conducted by using the alloy of the present invention comprising Cd and one metal selected from Sn, Pb, In and Bi as the test electrode and with alloy proportion as a parameter. Further, as Comparative Examples, tests were conducted by using various elemental metals as the test electrode. Typical results were shown in Table 1. Further, in FIG. 1 was plotted the discharge capacity at the 15th cycle against weight % of Cd in the negative electrode of the alloy of the present invention and in FIG. 2 was plotted the cycle characteristic. As can be seen from Table 1, among various elementary metals, Sn, Pb, In, Ag and Al caused, after repeated charge-and-discharge cycle, pulverization and falling off of the electrode and a sharp decline in the quantity of electricity in charge-and-discharge. In the case of aluminum (Al), pulverization occurred in the course of the first cycle charging. In the case of Hg, it was converted by discharge into liquid particulate mercury and the shape of the electrode could not be maintained. Also when Sn-Pb alloy was used, pulverization and falling off took place after repeated charge-and-discharge cycle, which showed that not every kind of alloy gave good results. As can be seen from Table 1, when Cd was used, no pulverization occurred and the shape was maintained stably even after repeated charge-and-discharge cycle; but the quantity of electricity in charge and discharge was small. When the alloy of the present invention containing Cd was used as the negative electrode, no pulverization of the electrode occurred even after repeated charge-and-discharge cycle. Thus, it is considered that Cd in the alloy plays a role of binder, preventing the pulverization of the electrode. Further, as is apparent from the quantity of electricity in discharge at the 1st cycle in Table 1, the alloying gave rise to increase of the quantity of electricity in discharge as compared with that of elementary metal. This is assumed to be due to a rapid diffusion of absorbed alkali metals, such as Li, along the interface between the phases in the alloy.

Figure 2:
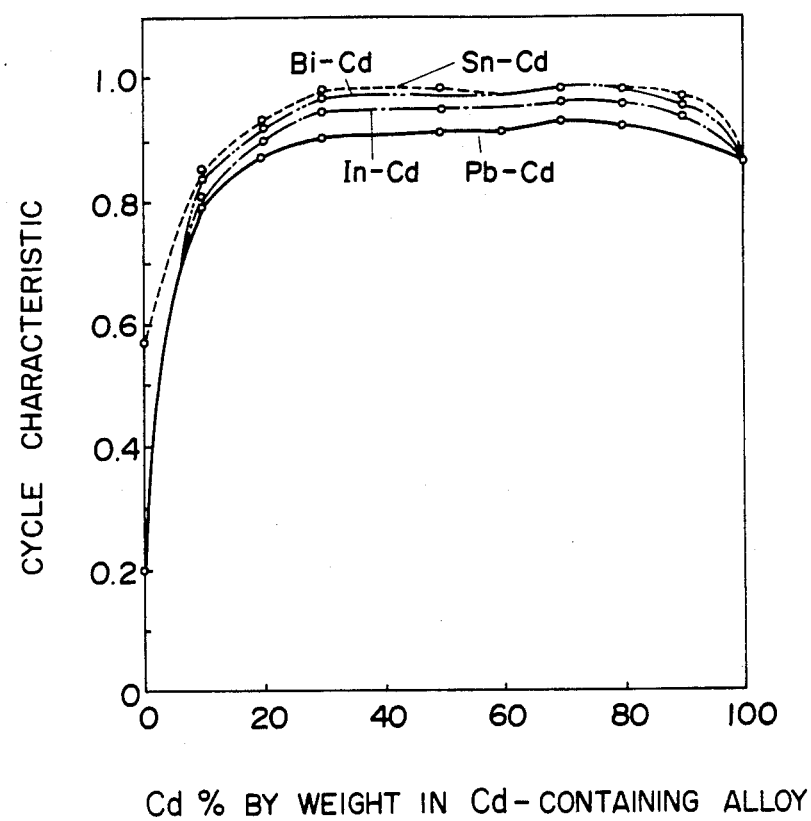
FIG. 2 is a graph obtained by plotting the cycle characteristic of the above-mentioned alloy. The "cycle characteristic" means herein the quantity of electricity in discharge at the 15th cycle divided by that at the 1st cycle.

FIG. 2 reveals that the amount of Cd necessary for giving a good cycle characteristic is 10% by weight or more. FIG. 1 reveals that the amount of Cd is preferably 80% by weight or less to give a large quantity of electricity in discharge.

TABLE 1

Negative electrode characteristic of alloy

| Negative electrode composition | Quantity of electricity in discharge at 1st cycle | Quantity of electricity in discharge at 15th cycle | cycle characteristic |
|---|---|---|---|
| Bi(70)-Cd(30) | 61.4 mAh | 59.6 mAh | 0.97 |
| Pb(70)-Cd(30) | 33.4 | 30.1 | 0.90 |
| Sn(70)-Cd(30) | 53.4 | 52.3 | 0.98 |
| In(70)-Cd(30) | 51.3 | 47.7 | 0.93 |
| Sn | 25.1 | 14.3 | 0.57 |
| Bi | 25.3 | 4.8 | 0.19 |
| Cd | 26.0 | 22.4 | 0.86 |
| Pb | 16.1 | 3.2 | 0.20 |
| Al | 3.4 | 1.7 | 0.50 |
| Ag | 16.1 | 2.7 | 0.17 |
| Hg | 3.7 | 3.0 | 0.81 |
| Li | 200 | 0.02 | 0.0001 |

EXAMPLE 2

Figure 3:
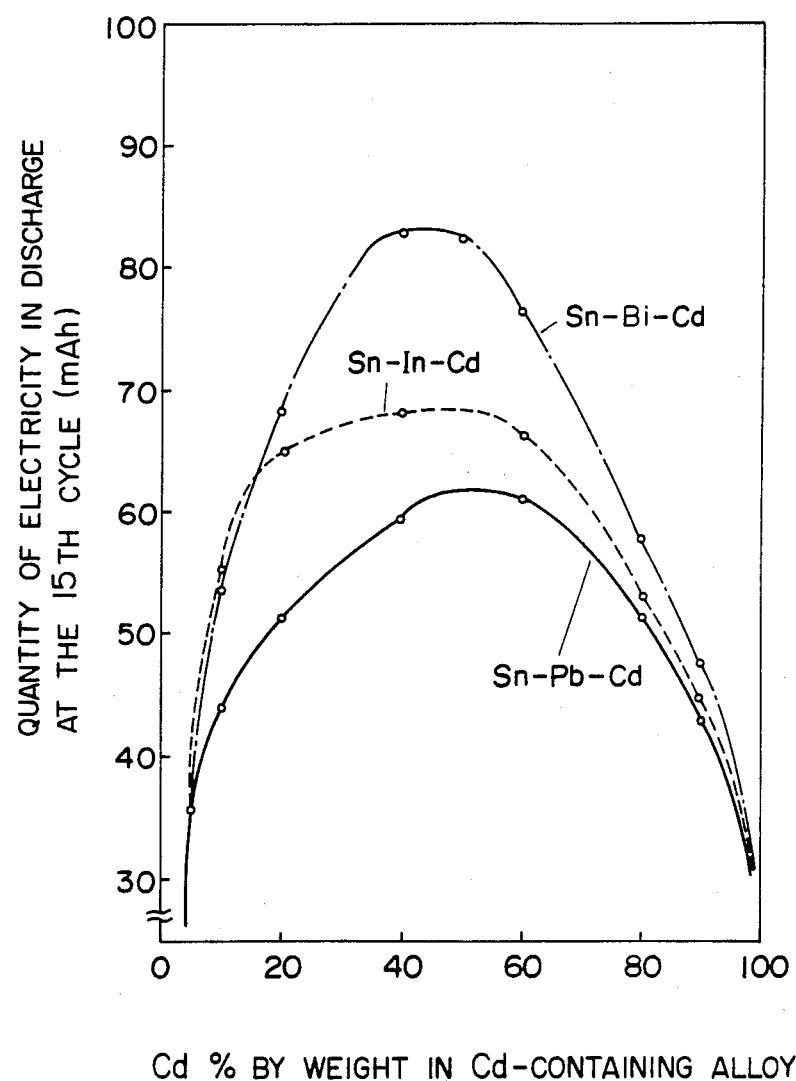
FIGS. 3 and 4 are graphs obtained by plotting Cd % by weight in alloys comprising Cd and two metals selected from the group consisting of Sn, Pb, Bi and In against the quantity of electricity in discharge at the 15th cycle.
Figure 4:
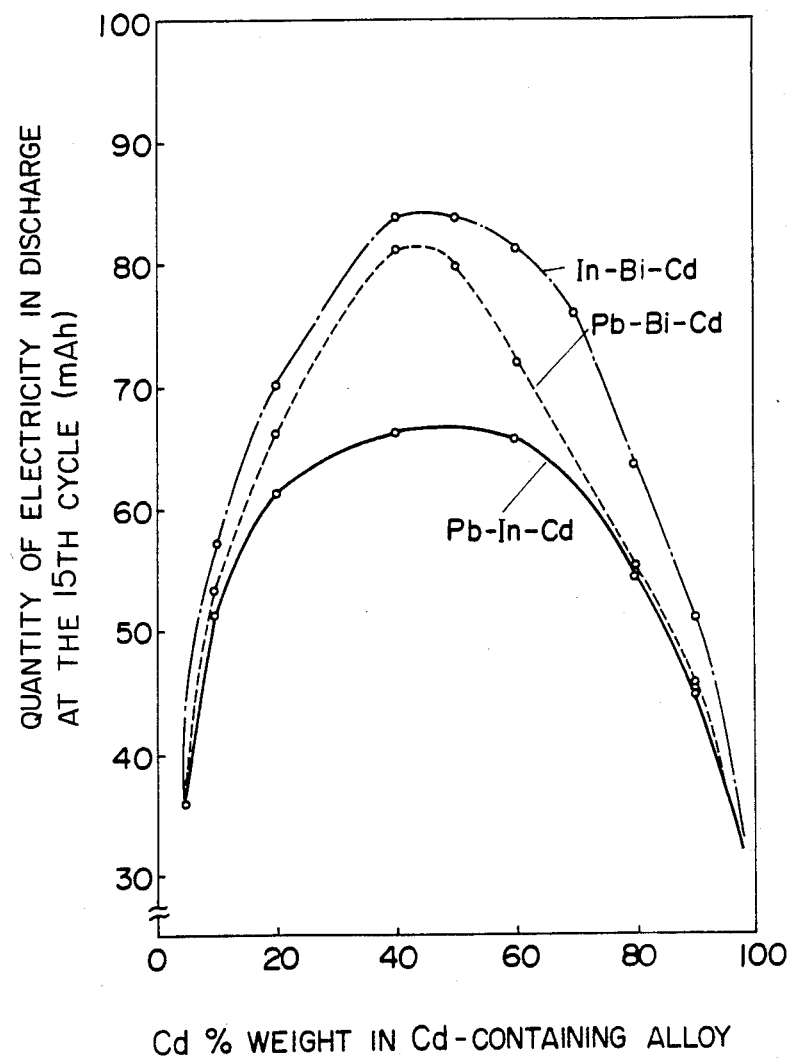

Multiple component alloys comprising Cd and at least two metals selected from the group of Sn, Pb, In and Bi were examined in the same manner as in Example 1. The results obtained are as shown in Table 2. FIG. 3 shows, for alloys comprisng Sn and Pb in 1:1 by weight and Cd in varied percentage by weight, alloys comprising Sn and Bi in 1:1 by weight and Cd in varied amount and alloys comprising Sn and In in 1:1 by weight and Cd in varied percentage by weight, the percent by weight of Cd in the alloy plotted against the quantity of electricity in discharge at the 15th cycle. FIG. 4 shows, for alloys comprising Pb and In in 1:1 and Cd in varied percentage by weight, alloys comprising Pb and Bi in 1:1 and Cd in varied amount, and alloys comprising In and Bi in 1:1 and Cd in varied percentage by weight, the percent by weight of Cd in the alloy plotted against the quantity of electricity in discharge at the 15th cycle. Table 2 reveals that the cycle characteristics of alloys containing Cd are as excellent as those of alloys shown in Table 1. But as in apparent from FIGS. 3 and 4, as to the quantity of electricity in discharge at the 15th cycle, the ternary alloy comprising Cd and at least two metals selected from the group consisting of Sn, Pb, In and Bi was more excellent. From this also, it can be estimated that the interface between phases in the alloy is an important factor in the diffusion of absorbed Li.

Figure 5:
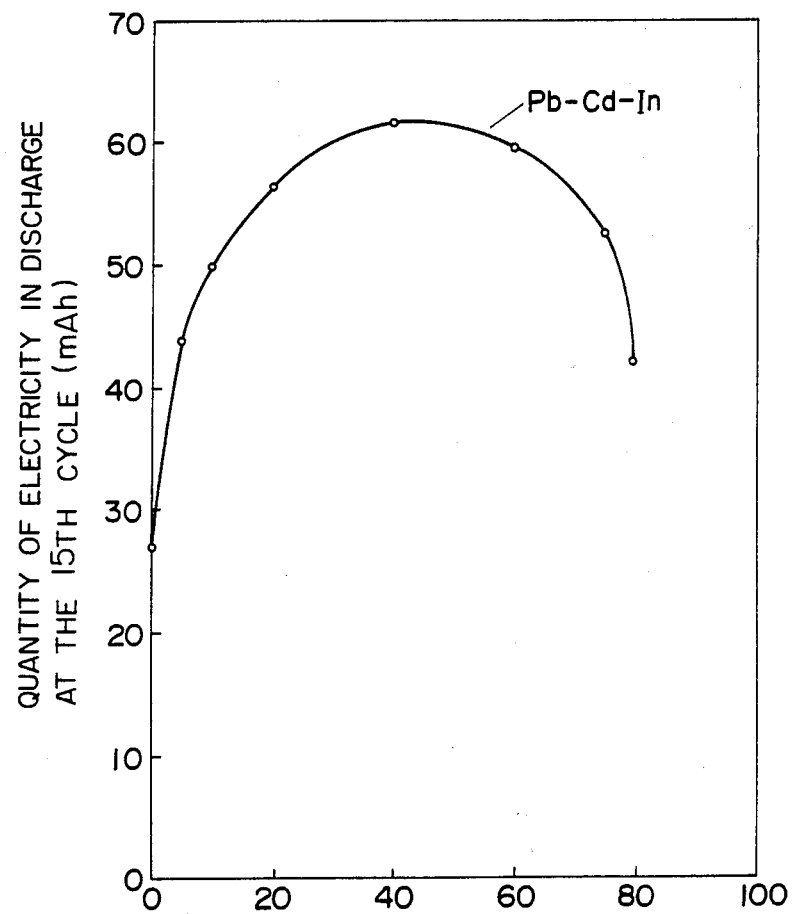
FIG. 5 is a plot of the quantity of electricity in discharge against In % by weight in Pb-In-Cd alloy.

FIG. 5 shows the effect of the ternary alloy containing Cd used as the negative electrode, using Pb-In-Cd- alloys containing 20% by weight of Cd as a representative example, by plotting the quantity of electricity in discharge at the 15th cycle against varied percentage by weight of In. It is revealed that In is effective in an amount of 5% by weight or more. Thus, also when a ternary alloy containing Cd is used, the effect of increasing the quantity of electricity in discharge was marked when the alloy contained 10 to 80% by weight of Cd and at least 5% by weight of the remaining two components.

TABLE 2

Negative electrode characteristic of alloy

| Composition (weight ratio) | Quantity of electricity in discharge at 1st cycle | Quantity of electricity in discharge at 15th cycle | Cycle characteristic |
|---|---|---|---|
| Pb(40)-Sn(40)-Cd(20) | 54.6 mAh | 51.3 mAh | 0.94 |
| Pb(60)-Sn(20)-Cd(20) | 48.6 | 43.7 | 0.90 |
| Pb(20)-Sn(60)-Cd(20) | 58.4 | 54.3 | 0.93 |
| Sn(40)-In(40)-Cd(20) | 68.4 | 65.0 | 0.95 |
| Pb(40)-In(40)-Cd(20) | 68.0 | 61.2 | 0.90 |
| Pb(75)-In(5)-Cd(20) | 48.6 | 43.7 | 0.90 |
| Sn(40)-Bi(40)-Cd(20) | 72.9 | 68.5 | 0.94 |
| Pb(40)-Bi(40)-Cd(20) | 71.7 | 66.0 | 0.92 |
| In(40)-Bi(40)-Cd(20) | 75.4 | 70.1 | 0.93 |
| Bi(50)-Pb(24)-Sn(14)-Cd(12) | 107.0 | 95.2 | 0.89 |

EXAMPLE 3

Figure 6:
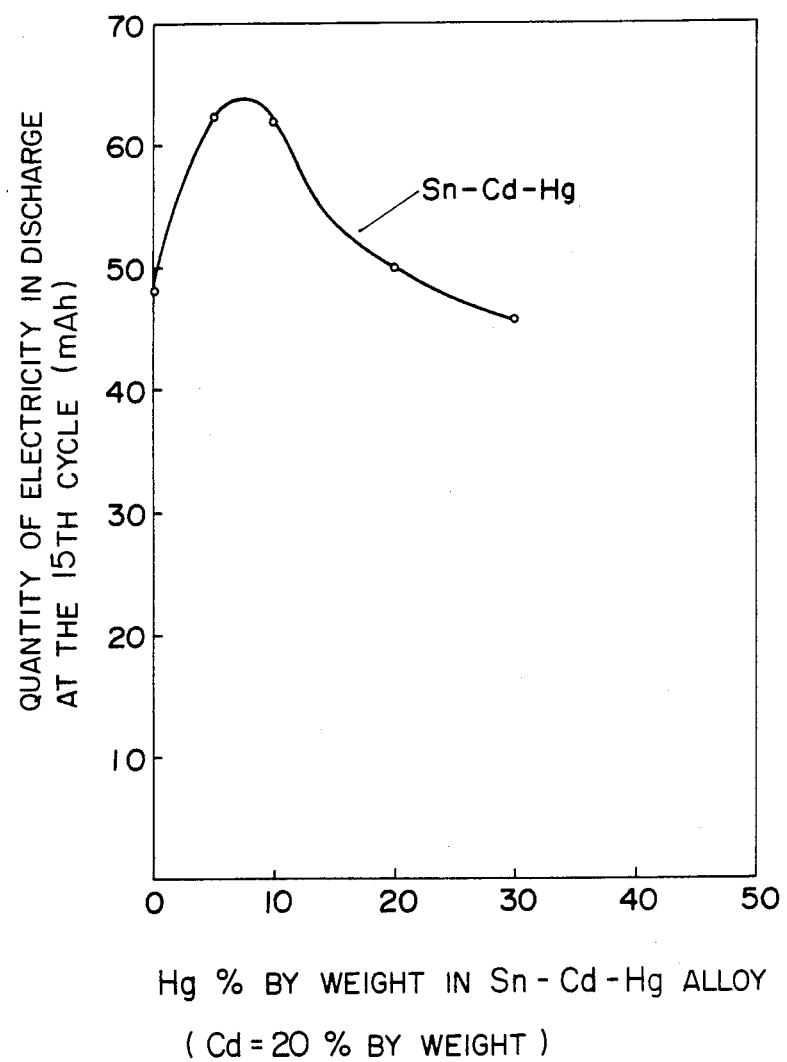
FIG. 6 is a graph correlating the mercury content in Sn-Cd-Hg alloy with the quantity of electricity in discharge.
Figure 7:
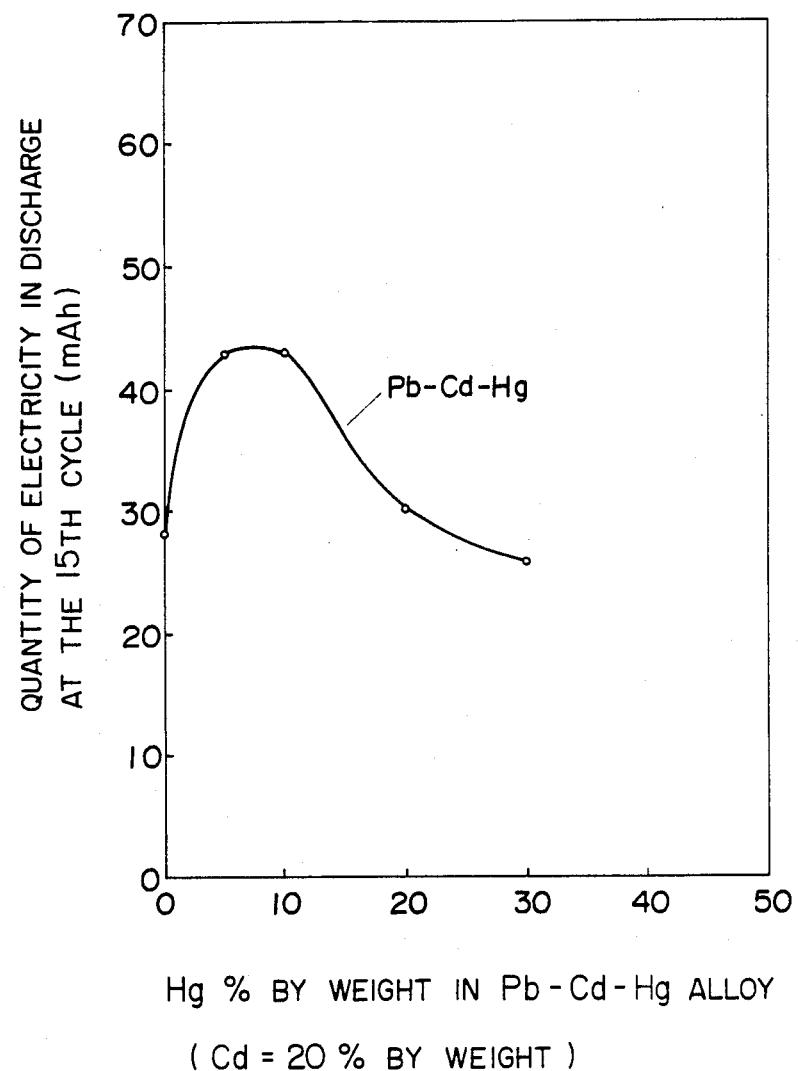
FIG. 7 is a graph correlating the mercury content in Pb-Cd-Hg alloy with the quantity of electricity in discharge.

Characteristics as a negative electrode were examined of alloys obtained by adding at least one metal selected from the group consisting of mercury (Hg), silver (Ag), antimony (Sb) and calcium (Ca) to an alloy of Cd with at least one alloy selected from the group consisting of Sn, Pb, In and Bi. The procedures of examination were similar to those in Example 1. The results obtained are as shown in Table 3. The examination was conducted also with varied amounts of Hg, Ag, Sb and Ca added and the results were shown in FIGS. 6 to 10. As typical examples of Ag addition, FIGS. 6 and 7 show, for Sn-Cd-Hg alloy and Pb-Cd-Hg alloy respectively, each alloy having a fixed Cd content of 20% by weight, the quantity of electricity in discharge at the 15th cycle plotted against varied percentage by weight of Hg in the alloy. From these Figures, increase in the quantity of electricity in discharge can be seen at the added amount of Ag of 20% by weight.

TABLE 3

Negative electrode characteristics of alloys

| Composition | Quantity of electricity in discharge at 1st cycle | Quantity of electricity in discharge at 15th cycle | Cycle characteristic |
|---|---|---|---|
| Sn(75)-Cd(20)-Hg(5) | 65.5 mAh | 62.2 mAh | 0.95 |
| Sn(75)-Cd(20)-Ag(5) | 66.3 | 61.7 | 0.93 |
| Sn(75)-Cd(20)-Ca(5) | 62.1 | 57.1 | 0.92 |
| Sn(75)-Cd(20)-Sb(5) | 60.7 | 55.2 | 0.91 |
| Pb(75)-Cd(20)-Hg(5) | 46.2 | 43.0 | 0.93 |
| Pb(75)-Cd(20)-Ag(5) | 40.0 | 37.2 | 0.93 |
| Pb(75)-Cd(20)-Ca(5) | 38.5 | 35.0 | 0.91 |
| Pb(75)-Cd(20)-Sb(5) | 37.0 | 33.7 | 0.91 |
| In(75)-Cd(20)-Hg(5) | 60.1 | 55.3 | 0.92 |
| In(75)-Cd(20)-Ag(5) | 58.4 | 53.7 | 0.92 |
| In(75)-Cd(20)-Ca(5) | 56.7 | 51.0 | 0.90 |
| In(75)-Cd(20)-Sb(5) | 55.1 | 49.6 | 0.90 |
| Bi(75)-Cd(20)-Hg(5) | 52.2 | 48.0 | 0.92 |
| Bi(75)Cd(20)-Ag(5) | 50.1 | 46.1 | 0.92 |

Figure 8:
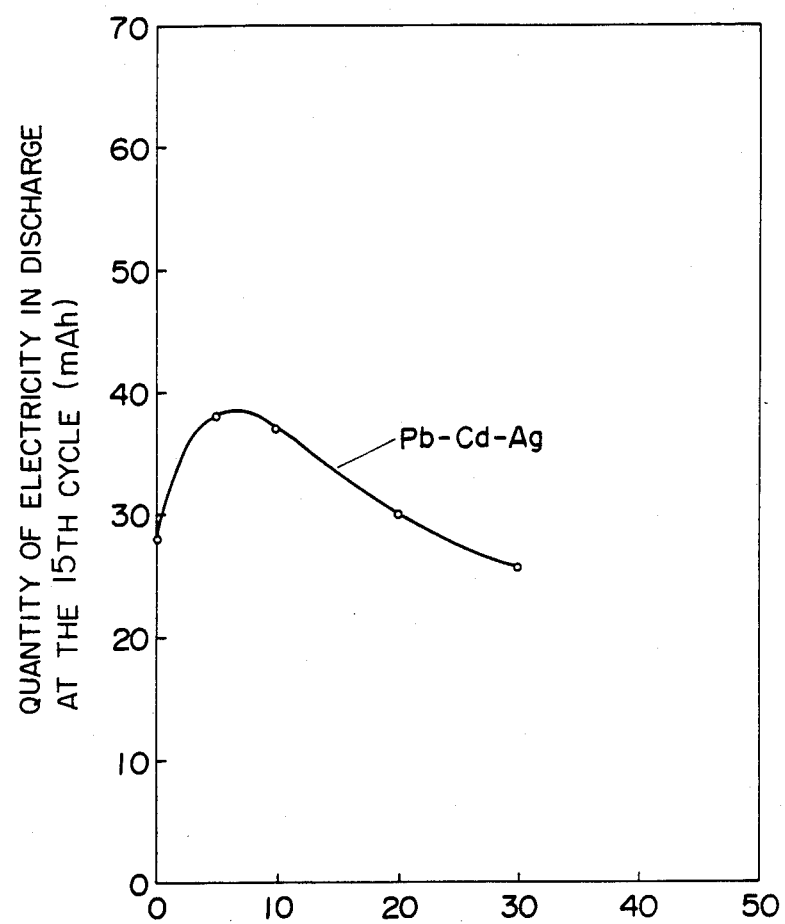
FIG. 8 is a graph correlating the silver content in Pb-Cd-Ag alloy with the quantity of electricity in discharge.
Figure 9:
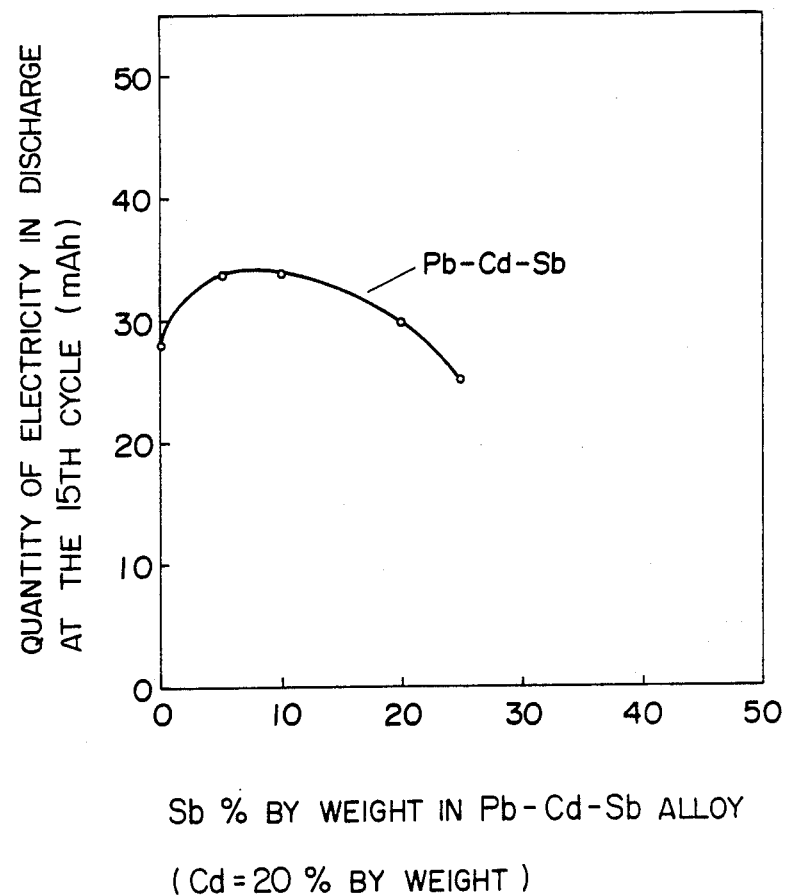
FIG. 9 is a graph correlating the Sb content in Pb-Cd-Sb alloy with the quantity of electricity in discharge.
Figure 10:
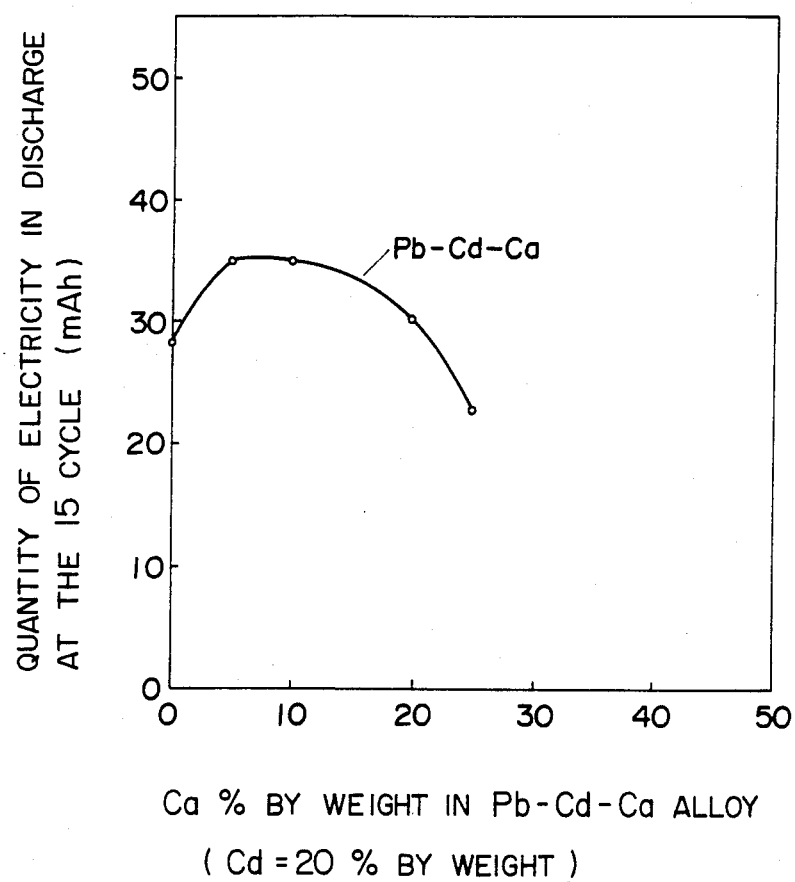
FIG. 10 is a graph correlating the Ca content in Pb-Cd-Ca alloy with the quantity of electricity in discharge.

As to typical examples of addition of Ag, Sb and Ca, FIG. 8 shows, for Pb-Cd-Ag alloys having a fixed Cd content of 20% by weight, the quantity of electricity in discharge at the 15th cycle of the alloys having varied percentage by weight of Ag; similarly, FIG. 9 shows the results for Pb-Cd-Sb alloy and FIG. 10 that for Pb-Cd-Ca alloy.

From the results obtained above, when the amount of Hg, Ag, Sb and Ca added to the alloy was 20% by weight or less, an increase in the quantity of electricity in discharge was seen as compared with that of alloy prior to such addition. This is presumably due to the smooth diffusion of Li along the interface between phases in alloy as mentioned above.

EXAMPLE 4

Figure 11:
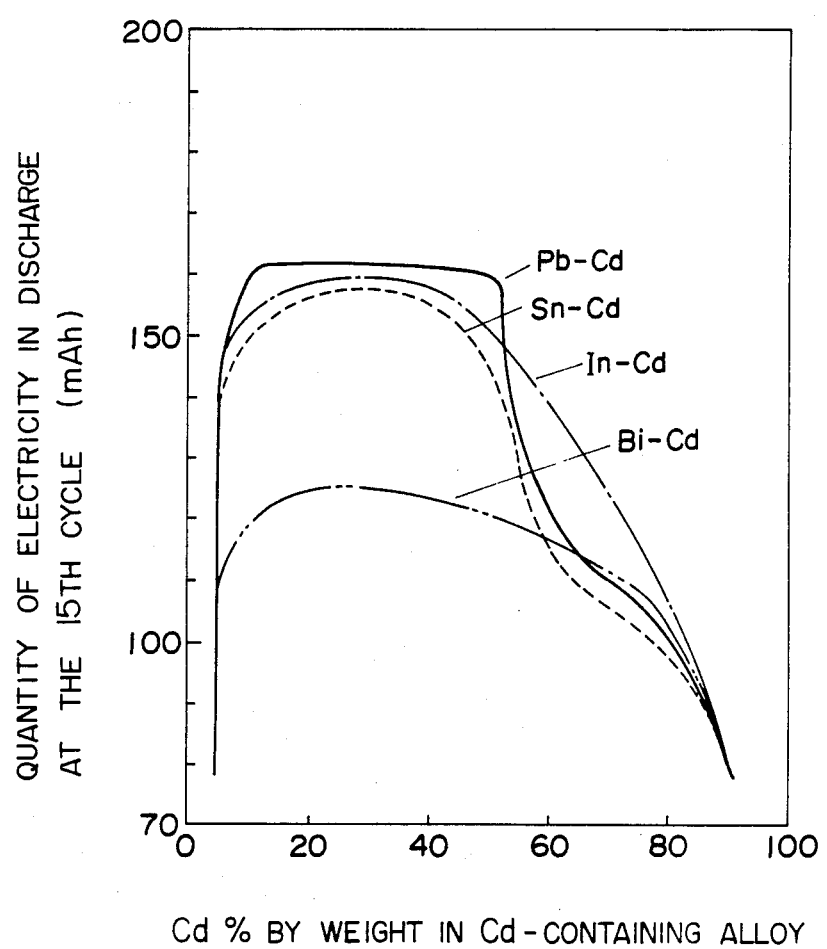
FIG. 11 is a graph showing the relationship between Cd content in alloy and the quantity of electricity in discharge in low-rate charge-and-discharge.

Example 1 to 3 showed the results obtained on charge and discharge at a constant current of 5 mA and revealed that, in high-rate charge-and-discharge, the interface between phases in alloy becomes an important factor as to the quantity of electricity in discharge. The present Example shows the results of low-rate charge-and-discharge for alloys comprising Cd and one metal selected from Sn, Pb, Bi and In. Test was conducted in an approximately same manner as in Example 1 but at a current of 1 mA. FIG. 11 is a plot of the quantity of electricity in discharge at the 15th cycle against varied percentage by weight of Cd in the alloy. The cycle characteristic was, similarly to the results shown in FIG. 2, good at Cd content of 10% by weight or more. As to the quantity of electricity in discharge, however, good results were obtained at Cd content of at least 10% by weight and not more than 50% by weight. But, even when the content was 80% by weight a large quantity of electricity in discharge can be obtained. When the Cd content is 5% or less, the electrode underwent pulverization and fell off in the course of repeated charage-and-discharge cycle.

EXAMPLE 5

The cycle characteristic of the negative electrode of the alloy of the present invention was compared with that of prior art using Li. As the negative electrode was used an 80:20 alloy of Sn and Cd. The dimension of the electrode was 1 cm square and 50 mm thick. The negative electrode of prior art using Li was also of the same dimension. As to the positive electrode, graphite, a typical carbon, was used, which had been compression-molded to give a dimension of 1 cm square and 3 mm thick, with polyethylene tetrafluoride used as binder. In above molding, titanium expanded metal was embedded as the current collector into the positive electrode. As to electrolyte, propylene carbonate containing 1 mol/l of lithium perchlorate dissolved therein was used. In this electrochemical cell, the quantity of electricity in discharge is, as is shown in FIG. 12, small for the size of the positive electrode, and so an electrochemical cell of this constitution may, with respect to charge-and-discharge capacity, be regarded as a capacitor.

By using this electrochemical cell, charge was conducted at 1 mA until the terminal voltage between the positive and negative electrode reached 3V, and then discharge was conducted until the voltage reached 2V. The above charge-and-discharge was conducted repeatedly. FIG.12 shows the quantity of electricity in discharge in each cycle of the electrochemical cell plotted against the number of cycles. As is apparent from FIG. 12, when Li is used as the negative electrode, charging and discharging become difficult in about 400 cycles. The reason for this is because when Li is used as the negative electrode precipitation of Li takes place in charge, and the precipitated Li falls off from the surface of the negative electrode.

On the other hand, in an electrochemical cell using the alloy of the present invention as the negative electrode, no change in charge-and-discharge characteristic was observed even after 2000 cycles of charge-and-discharge.

Thus, it is revealed that the electrochemical cell using the alloy of the present invention exhibits a more excellent performance than prior negative electrode using Li, an alkali metal.

POSSIBILITY OF INDUSTRIAL UTILIZATION

The alloy of this invention reversibly absorbs and desorbs alkali metal ions, as the result of charge and discharge, in nonaqueous electrolyte containinG alkali metal ions, so that it endures repeated charge-and-discharge and gives a rechargeable negative electrode having a long charge-and-discharge life. Accordingly, it can be utilized in a rechargeable electrochemical apparatus including, particularly, a secondary battery using Li as negative-electrode active material. Further, by suitable choice of alloy composition a secondary battery of high energy density can be obtained.

We claim:

1. A rechargeable electrochemical apparatus comprising a organic electrolyte containing an alkali metal in ionic form, a reversible positive electrode, and a rechargeable negative electrode, said apparatus containing no alkali metal in the metallic state, and said rechargeable negative electrode being comprised of a cadmium alloy,
   wherein said cadmium alloy comprises at least 10 percent by weight of Cd and at least one metal selected from the group consisting of Sn, In, Pb and Bi,
   wherein said cadmium alloy, as a result of charging said apparatus at a more noble potential than that of the metallic alkali metal, absorbs said alkali metal ions from said electrolyte to form an intermetallic compound therewith which is comprised of at least one metal of said alloy and said alkali metal, without the formation of metallic alkali metal, and
   wherein said cadmium alloy, as the result of discharging said apparatus, desorbs said alkali metal from the intermetallic compound into the electrolyte as ions.

2. The rechargeable electrochemical apparatus according to claim 1, wherein said alkali metal is Li.

3. The rechargeable electrochemical apparatus according to claim 1, wherein said alloy is an alloy of Sn and Cd.

4. The rechargeable electrochemical apparatus according to claim 1, wherein said alloy is an alloy of Sn, In and Cd.

5. The rechargeable electrochemical apparatus according to claim 1, wherein said alloy is an alloy of Pb and Cd.

6. The rechargeable electrochemical apparatus according to claim 1, wherein said alloy is an alloy of Pb, In and Cd.

7. The rechargeable electrochemical apparatus according to claim 1, wherein said alloy is an alloy of Pb, Sn and Cd.

8. A rechargeable electrochemical apparatus comprising an organic electrolyte containing an alkali metal in ionic form, a reversible positive electrode, and a rechargeable negative electrode, said apparatus containing no alkali metal in the metallic state either before, during or after operation thereof, and said rechargeable negative electrode being comprises of a cadmium alloy,
   wherein said cadmium alloy comprises at least 10 percent by weight of Cd and at least one metal selected from the group consisting of Sn, In, Pb and Bi,
   wherein said cadmium alloy, as a result of charging said apparatus at a more noble potential than that of the metallic alkali metal, absorbs said alkali metal ions from said electrolyte up to a saturation amount to form an intermetallic compound therewith which is comprises of at least one metal of said alloy and said alkali metal, without the formation of metallic alkali metal, and wherein said cadmium alloy, as the result of discharging said apparatus, desorbs said alkali metal from the intermetallic compound into the electrolyte as ions.

9. A rechargeable electrochemical apparatus comprising an organic electrolyte containing Li in ionic form, a reversible positive electrode, and a rechargeable negative electrode, said apparatus containing no Li in the metallic state either before, during or after operation thereof, and said rechargeable negative electrode being comprises of a cadmium alloy, wherein said cadmium alloy comprises at least 10 percent by weight of Cd, up to 20% by weight of Li and at least one metal selected from the group consisting of Sn, In, Pb and Bi, wherein said cadmium alloy, as a result of charging said apparatus at a more noble potential than that of LI, absorbs Li ions from said electrolyte up to a saturation amount of about 20% by weight Li to form an intermetallic compound therewith which is comprised of at least one metal of said alloy and Li, without the formation of metallic Li, and wherein said cadmium alloy, as the result of discharging said apparatus, desorbs Li from the intermetallic compound into the electrolyte as Li ions.

* * * * *